July 3, 1951 W. H. ZINN 2,558,919
METHOD FOR MEASURING RADIATION OF NEUTRONS
Filed May 22, 1945

Witnesses:
Hubert E. Metcalf
Paul J. Glaister

Inventor:
Walter H. Zinn
By: Robert A. Lavender
Attorney

Patented July 3, 1951

2,558,919

UNITED STATES PATENT OFFICE 2,558,919

METHOD FOR MEASURING RADIATION OF NEUTRONS

Walter H. Zinn, Chicago, Ill., assignor to the United States of America as represented by the United States Atomic Energy Commission Application May 22, 1945, Serial No. 595,187

2 Claims. (Cl. 250—83)

The present invention relates to neutron responsive devices and particularly to neutron density indicating means adapted for use in connection with the control and operation of neutron generators such as neutronic reactor systems.

A neutronic reactor system, as the term is used herein, constitutes a complete system designed for initiating and carrying out chain nuclear reactions. Such systems include a neutronic reactor wherein neutrons are developed and reserved for sustaining the reaction, control apparatus for initiating and controlling the progress of the reaction, and shielding means for protecting the operating personnel from the radiations developed during the operation of the system. The power being developed in a neutronic reactor system at any particular instant is, in general, proportional to the average neutron density existing at that particular time within the reactor unit. Neutron density thus provides a convenient means for monitoring and controlling the operation of neutronic reactor systems, and as a result there is an existing need for a simple, reliable device which is capable of giving an accurate and continuous indication of neutron density within or adjacent to a neutronic reactor. There is also a need for a simple, easily followed procedure for the immediate detection of neutron radiations and for the obtaining of single measurements of neutron intensity. The provision of such apparatus and methods are the principal objects of the present invention.

As will hereinafter appear, the above stated objects are accomplished through the utilization of my discovery that certain combinations of fissionable and luminescent materials when subjected to neutron irradiation are capable of producing luminescence in a wave band which is susceptible of convenient measurement. The various novel structural features of the improved neutron density indicating means and the details of the improved methods of determining neutron density which constitute the present invention will be made more apparent in the following description with reference to the accompanying drawing wherein:

As previously indicated, the improved apparatus and method of the present invention are made possible by my discovery that certain combinations of fissionable and fluorescent materials are capable of producing luminescence when subjected to neutron irradiation. Specifically, I have discovered that a composite member which fluoresces or phosphoresces when subjected to neutron irradiation, with the production of light energy in the general wave length band of about 200 to 900 millimicrons, can be made by superposing a layer of a fluorescent or phosphorescent material upon a layer of a material which fissions when subjected to neutron irradiation. No single material has been discovered in the extensive investigations I have conducted which is capable of producing visible luminescence as a direct result of neutron irradiation. However, if a thin layer of luminescent material such as zinc sulphide, or various of other known phosphors, is placed in contact with a body comprising or containing fissionable material, such as uranium, the radiations resulting from the radioactive decay of certain of the fission products formed as a result of fissions induced in the fissionable constituent of uranium by neutron irradiation thereof will induce luminescence. This luminescence is, in general, proportional to the density of the neutron irradiation. Having obtained a source of luminescence at intensity levels which are substantially proportional to neutron density, the neutron density may be determined by the convenient procedure of measuring the intensity of the induced luminescence. This can be done most satisfactorily by use of a photocell.

In instances where it is desired to continuously measure neutron density, as during the operation of a neutronic reactor, it will be found desirable to combine a neutron responsive fluorescent element of the type described above with a photocell and to employ this combination as an explanatory unit located within, or adjacent the neutronic reactor. Metering equipment located externally of the reactor shield may be used to provide a continuous indication of the neutron density at the location of the neutron responsive element and photocell exploratory unit.

In instances where it may be desired to obtain only a single reading or a series of readings of neutron density, it may be found more convenient to utilize an exploratory unit which consists solely of a neutron responsive element of the type which fluoresces when subjected to neutron irradiation. Such a unit may be placed in any desired location for a sufficient period of time to initiate fluorescence therein, whereupon the unit may be removed and the intensity of the induced fluorescence during the relatively long decay period of the fission products measured at any convenient location by a photocell or other means. Comparison of the indicated measurement with known standards will permit accurate evaluation of the neutron density at the particular location in question.

Figure 1:
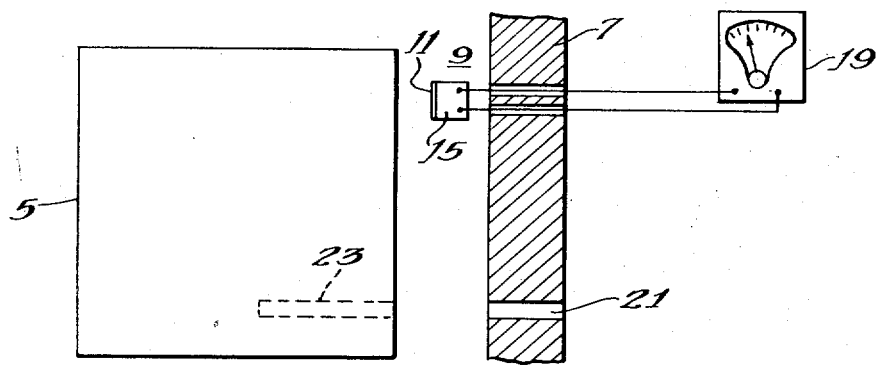
Fig. 1 is a diagrammatic view of a neutron density indicating means, in accordance with the invention, actuable to give a continuous indication of neutron density.
Figure 2:
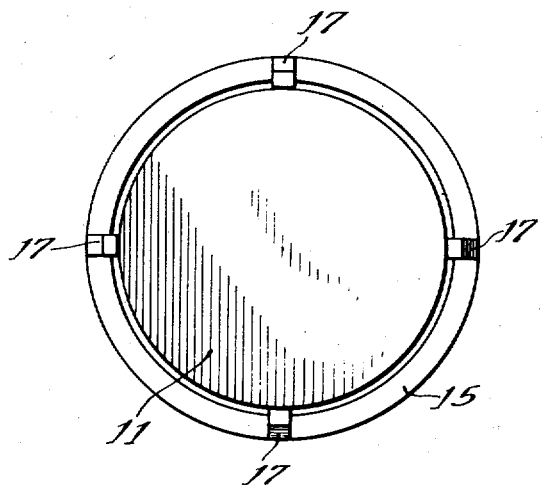
Fig. 2 is a front view, in elevation, of the exploratory unit forming a part of the neutron density indicating means shown in Fig. 1.
Figure 3:
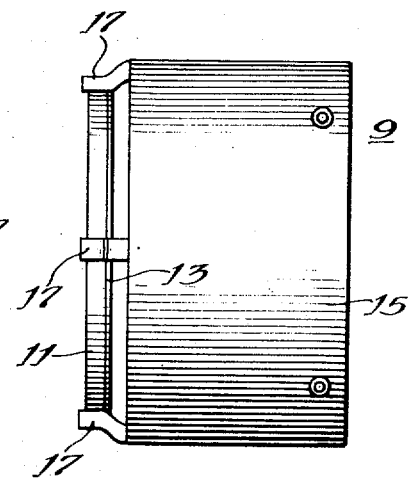
Fig. 3 is a side view, in elevation, of the device shown in Fig. 2.
Figure 4:
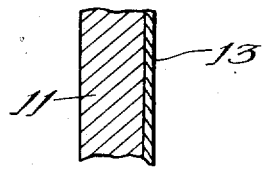
Fig. 4 is an enlarged, fragmentary, sectional view of the neutron responsive element of the exploratory unit illustrated more completely in Figs. 2 and 3.

A continuous indicating system utilizing a neutron responsive, fluorescent element of the type described above is illustrated in Fig. 1 of the drawing. A neutronic reactor or other source of neutrons is indicated generally at 5. A portion of a protective shield such as normally surrounds all neutronic reactors and like devices is illustrated at 7. Internally of the shield 7 and located so as to receive neutron radiation from the source 5 there is provided a neutron responsive exploratory unit 9, in accordance with the invention. The unit 9 is shown particularly in Figs. 2 and 3, and includes a disc 11 preferably of uranium metal. Natural uranium contains the fissionable uranium isotope $92^{235}$ in a ratio of about $1/139$ to $U^{238}$ which is relatively non-fissionable. Other fissionable materials, such as $U^{233}$ or $94^{239}$, may be used as a constituent or coating of the disc 11. The disc 11 is coated with a thin layer 13 of luminescent material, such as copper activated zinc sulphide. The thickness of the layer 13 is sufficient to cover the disc 11 and may be of a thickness such as used in cathode ray tubes or X-ray responsive screens, the coated disc 11 being supported adjacent a photocell 15 by suitable supports 17 in such manner that the luminescence induced in the fluorescent layer 13 will activate the photocell. The photocell 15 is connected to an indicating instrument 19, conveniently of the galvanometer type, located externally of the shield 7 and, if desired, amplifying means of conventional type may be interposed between the photocell 9 and the indicating instrument 19.

Irradiation of the disc 11 by neutrons will cause fission of the fissionable material therein. Fission is occasioned by the capture of a neutron, causing splitting of the nucleus into two fragments comprising lighter elements and with the emission of beta and gamma energy. The beta energy liberated at or near the surface of the disc 11 carrying the luminescent material layer 13 will be highly effective in producing luminescence because of the high energy of beta emission upon fission. The gamma energy is likewise converted into visible light by the luminescent material and increases the total light output from the layer 13. Following fission, the fission fragments radioactively decay to stable end products with the emission of additional beta and gamma energy available to irradiate the layer 13, maintaining the light output thereof for a considerable time following cessation of neutron bombardment.

The spectral response of the luminescent material of layer 13 is preferably matched to that of the photo responsive device or photocell 15. For example, a blue emitting luminescent material such as silver-activated zinc sulphide or calcium tungstate may be used with a blue responsive phototube such as the RCA type 929 or 931A. Copper activated zinc sulphide, fluorescing in the yellow portion of the spectrum may be used and the light measured by a phototube type 921.

As previously indicated, when it is desired to utilize the neutron responsive luminescent means of the present invention for making single measurements of neutron density or as a neutron detection means, it will be found convenient to employ an exploratory unit which consists solely of a member of fissionable material which is coated with a layer of phosphorescent material. The procedure in obtaining a measurement of neutron intensity by the use of a unit of this type consists in introducing the exploratory unit into proximity with the reactor or other neutron source, leaving the unit there for a sufficient period of time to develop radioactivity by fission for developing luminescence, and then removing the unit to a location, preferably externally of the protective shield, where measurements of the induced luminescence can be made. The exploratory unit employed in such instances may be of substantially the same general construction as the neutron responsive element of the previously described embodiment of the invention. For example, the unit may comprise a flat sheet of uranium metal, about $1/8$ inch thick, which is circular or rectangular in outline, as illustrated at 11, and which has on one face thereof a layer 13 of a suitable luminescent material. Preferably, the material is chosen to have considerable phosphorescence, thereby increasing the time for observation of the light output. Copper activated zinc sulphide is a suitable material. During use this unit may be introduced into any desired position within the reactor through access openings such as the openings 21 and 23 illustrated in the drawings. Due to the very small size of a unit of this type, it may be placed in locations which can not be reached by other known devices. The unit is permitted to remain within the reactor for a sufficient period of time to produce fission of some of the fissionable isotopes of the uranium to induce luminescence. The unit is then removed and the induced luminescence measured, most conveniently by the use of a photocell. The reading obtained may readily be evaluated by comparison with known standards. This method has proven highly satisfactory for the obtaining of single measurements of neutron density in locations where the use of the more complicated continuous indicating type, wherein the neutron responsive fluorescent unit and the photocell are permanently combined, is not required. If the exploratory unit is being used solely as a neutron detection means, it may be placed in any convenient spot where the induced luminescence may be visually observed.

In the foregoing, I have disclosed the features of a new and improved type of neutron density indicating means. The inventive concepts include the discovery of means whereby luminescence, that is, either fluorescence or phosphorescence or both, may be produced in response to neutron irradiation. The features of specific neutron responsive devices based on this discovery and of neutron density indicating means capable of continuous operation are disclosed. In addition, there is disclosed a new and improved method of detecting neutron irradiation, and of obtaining single measurements of neutron density in locations which cannot be reached by known exploratory means. The features of the invention which are believed to be new are expressly pointed out in the appended claims.

What is claimed is:

1. The method of determining the rate of power output of a neutronic reactor which comprises introducing into the reactor abutting layers of thermal neutron fissionable material and phosphorescent material, maintaining said layers in the reactor for a sufficient period of time to produce substantial fission, removing said layers from the reactor, and measuring the luminescence of the phosphorescent layer while retaining the layers in abutment, so that the decay of luminescence of the phosphorescent layer is diminished by the continued radioactivity of the fissionable material layer.

2. The method of determining the intensity of a neutron source which comprises introducing into the neutron field of the source abutting layers of thermal neutron fissionable material and phosphorescent material, maintaining said layers in the field for a sufficient period of time to produce substantial fission, removing said layers from the field, and measuring the luminescence of the phosphorescent layer while retaining the layers in abutment, so that the decay of luminescence of the phosphorescent layer is diminished by the continued radioactivity of the fissionable material layer.

WALTER H. ZINN.

REFERENCES CITED

The following references are of record in the file of this patent:

UNITED STATES PATENTS

| Number | Name | Date |
| --- | --- | --- |
| 2,272,375 | Kallmann et al. | Feb. 10, 1942 |
| 2,274,900 | Kallmann et al. | Mar. 3, 1942 |
| 2,288,717 | Kallmann et al. | July 7, 1942 |
| 2,351,028 | Fearon | June 13, 1944 |
| 2,401,288 | Morgan et al. | May 28, 1946 |
| 2,408,230 | Shoupp | Sept. 24, 1946 |